Oct. 27, 1953 L. L. MILLER 2,656,695
CONTROL MECHANISM FOR COMBINATION WASHERS AND DRIERS
Filed Oct. 13, 1948 6 Sheets-Sheet 1

Fig. 1.

INVENTOR.
LEWIS L. MILLER.
BY
M.W. Green
ATTORNEY.

Oct. 27, 1953     L. L. MILLER     2,656,695
CONTROL MECHANISM FOR COMBINATION WASHERS AND DRIERS
Filed Oct. 13, 1948     6 Sheets-Sheet 3

INVENTOR.
LEWIS L. MILLER.
BY
ATTORNEY.

INVENTOR.
LEWIS L. MILLER.

Patented Oct. 27, 1953

2,656,695

UNITED STATES PATENT OFFICE 2,656,695

CONTROL MECHANISM FOR COMBINATION WASHERS AND DRIERS

Lewis L. Miller, South Bend, Ind., assignor, by mesne assignments, to Avco Manufacturing Corporation, New York, N. Y., a corporation of Delaware Application October 13, 1948, Serial No. 54,278

11 Claims. (Cl. 68—12)

This invention relates to a combination washer and dryer. The primary object of the invention is to provide a machine wherein the clothes may be washed and dried in the same container, the drying operation automatically following the washing without attention by an operator.

It is also an object to provide a combination washing and drying machine wherein control mechanism for washing and drying are so related and arranged that the drying portion of the cycle may be preset and so arranged as to start in operation automatically upon the termination of the washing cycle and to continue through a definite time of drying.

The above and other objects of the invention will appear more fully from the following more detailed description and by reference to the accompanying drawings forming a part hereof and wherein.

Figure 2:
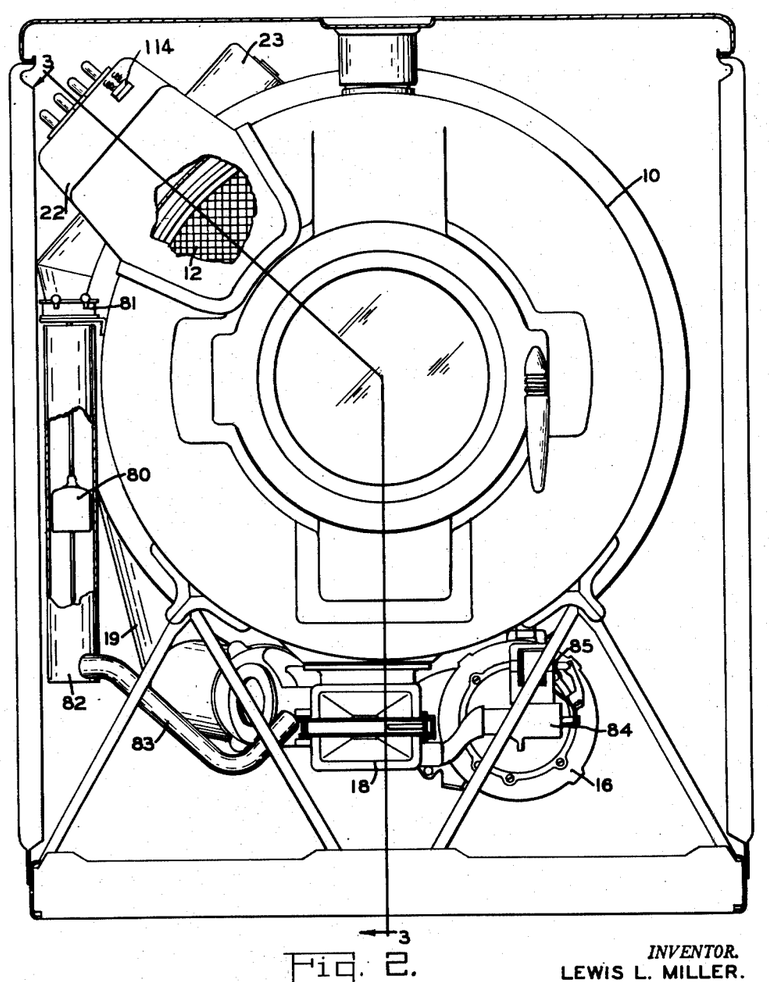
Figure 2 is a front view of the machine partially in section shown in Figure 1 including a view of the air circulating conduit for drying together with a showing of the position of the inlet into the tub.
Figure 3:
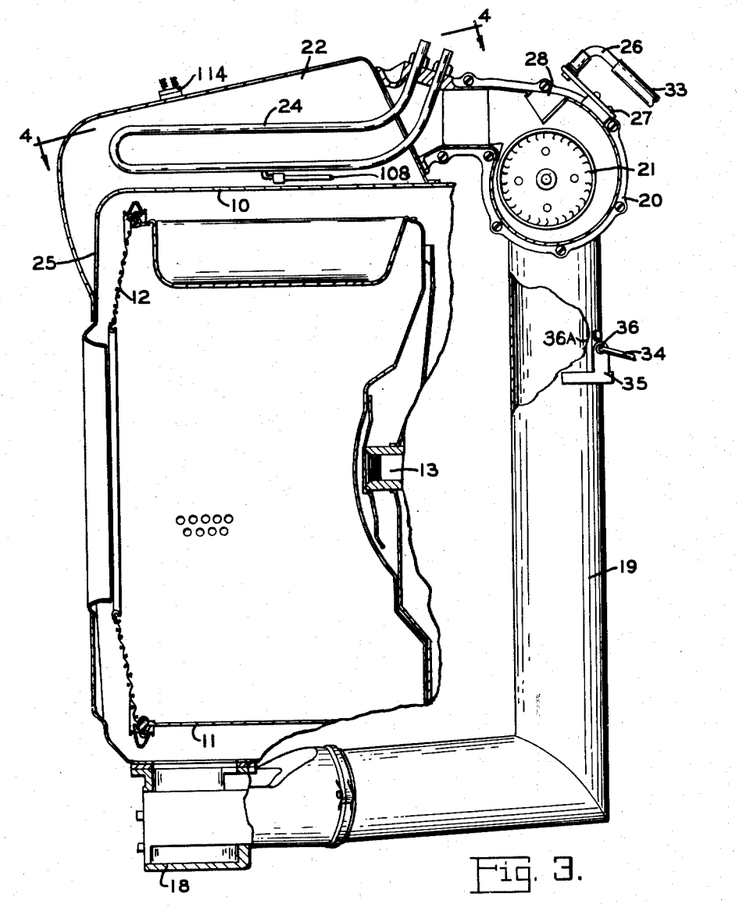
Figure 3 is a cross section through line 3—3 of Figure 2 showing the air circulating conduit, the washing machine tub and cylinder, and the general relationship of the several parts including the water inlet.
Figure 4:
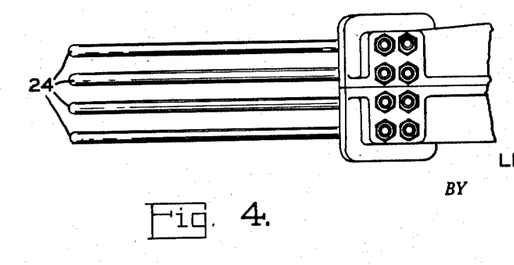
Figure 4 is a view through line 4—4 of Figure 3.
Figure 5:
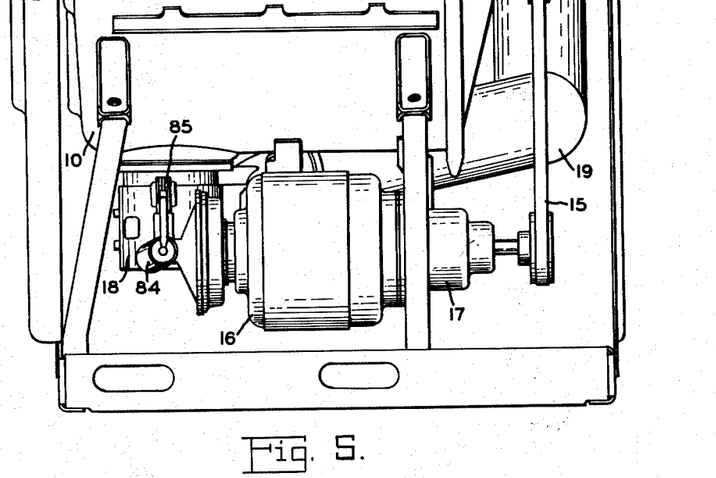
Figure 5 is a view through line 5—5 of Figure 1 showing the motor drive and other units including the drain pump and drain valve and the solenoid for actuating said pump and valve.

Referring to the drawings, a tub 10 has a clothes cylinder 11 mounted for rotation therein. As indicated in Figures 2 and 3, the clothes cylinder 11 has a perforated outer periphery and a screened front wall 12 which will allow air to enter therein. The clothes cylinder 11 is mounted for rotation and is supported from its backwall within the tub 10 by means of a shaft 13 and rotated by a pulley 14, belt 15, electric motor 16, and transmission 17. The bottom of the tub 10 is provided with an opening leading to a tube which is herein referred to as a condenser tube 19. Tube 19 is curved from the bottom of the sump 18 in a generally vertical direction and is mounted at the rear of tub 10, and its top end connects with the central inlet portion of a centrifugal type blower housing 20. Shown particularly in Figure 3 is a blower wheel 21 mounted inside the housing 20 at the juncture of the condenser tube 19 and a horizontal conduit 22 and which is driven by a motor 23 mounted above the blower housing 20. As shown in Figure 3 the horizontally positioned duct 20 has a plurality of electric heating elements 24 supported therein. Also shown in Figure 3 is an opening 25 in the wall of tub 10 which is provided in order that the conduit 22 will be in communication with the interior of the tub 10 and also with the interior of the clothes cylinder 11 through the screened front wall 12 thereof.

Figure 1:
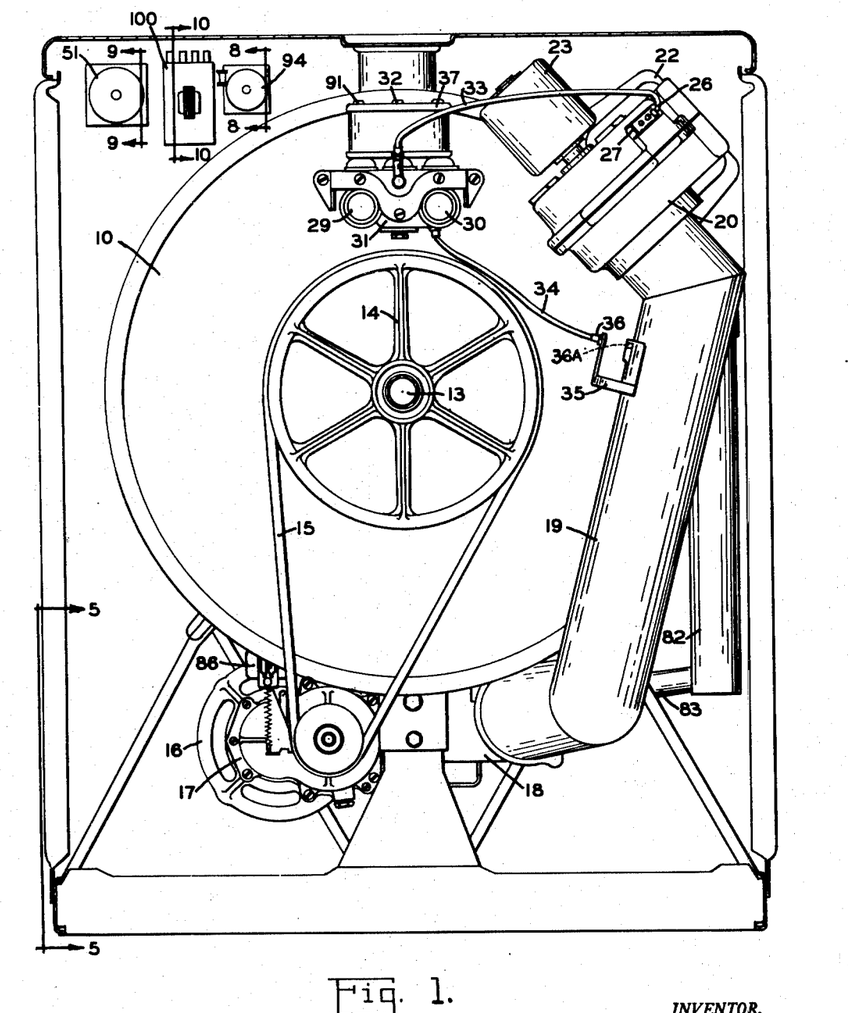
Figure 1 is a rear view of a combined washer and dryer constructed according to the present invention, the view showing a mechanism for air circulation, condensing of moisture, and mechanism for inlet of water into the machine as well as the timing devices for the wash and drying cycle and the temperature preselector for the drying cycle.

Figures 2 and 3 disclose the water inlet system with a nozzle 26 mounted on the blower housing 20 by means of a bracket 27. The nozzle is directed toward an opening 28 and a blower housing 20 in such a manner that the stream of water emitting from the nozzle 26 and entering the blower housing 20 through the opening 28 will be divided with a major portion of the water flowing through the conduit 22, over the heating elements, 24, and into the tub 10 through the opening 25 therein, while the lesser portion of the water will be deflected downward through the condensing tube 19 and into the tub 10 through the sump 18. As shown in Figure 1 water from a hot water conduit 29 and a cold water conduit 30 enters a mixing valve 31 controlled by a solenoid 32. The details of such a mixing valve, although forming no part in the invention, may be of the type disclosed in U. S. Patent No. 2,269,259 or 2,310,975. Water from the hot and cold conduits 29 and 30 is mixed in the valve 31 to achieve the desired temperature, and is carried to the water inlet nozzle 26 by a hose 33. Thus it is apparent that all the water that enters the machine for washing purposes passes either through the heating conduit 22 and over the heating elements 24, or down the condenser conduit 19 and into the tub 10 through the sump 18.

Leading from the cold water conduit shown in Figure 1 is a narrow tube 34 which extends to a bracket 35 mounted on the side of the condenser tube. An outlet end 36 of the narrow tube 34 is directed to an opening 36a in the side of the condenser tube 19. Water carried by the tube 34 is controlled by the solenoid 37 which is actuated only when the machine is used for drying as will be further described later in the specification. Water entering the condenser tube from this source forms a film on the inner surface of the tube 19 as it travels downward leaving room for upward passage of air in the center of the tube and thereby acts to condense moisture and remove lint from the air passing through the tube 19.

Figure 7:
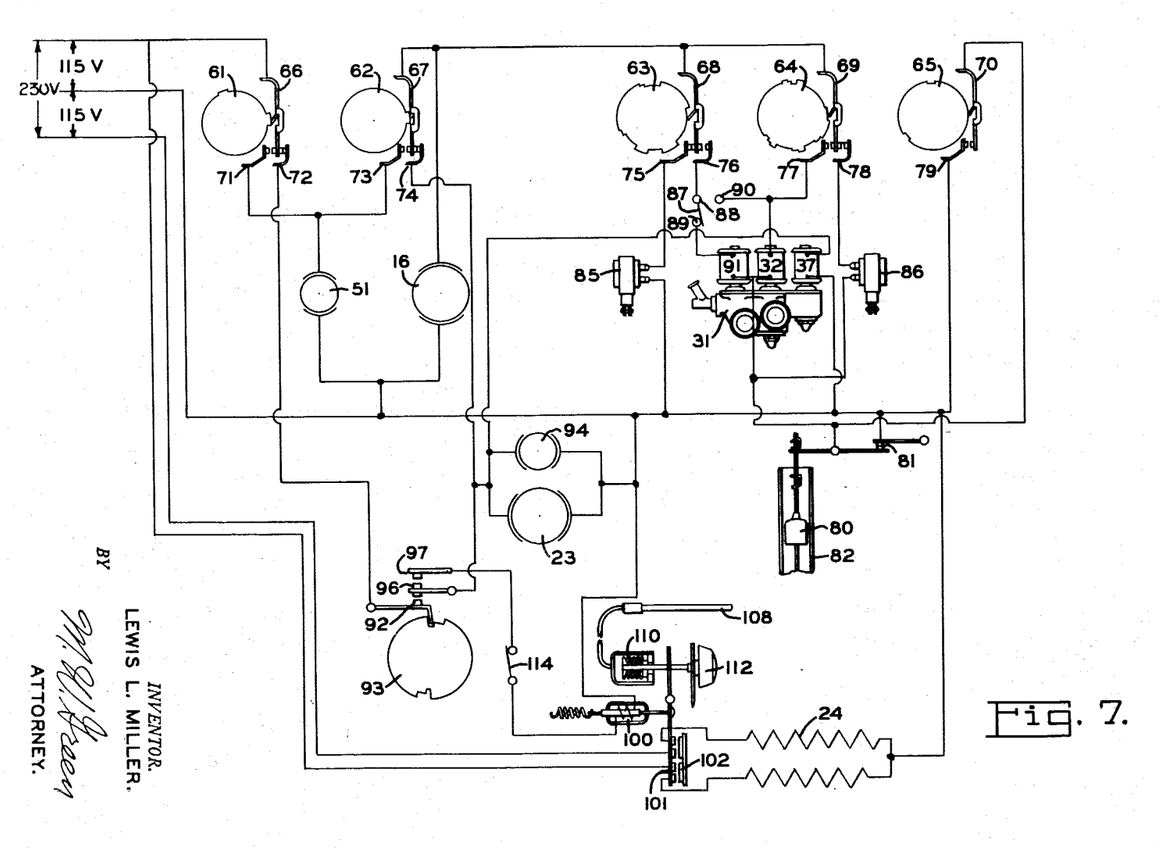
Figure 7 is the wiring diagram showing relationship of the several parts and the electrical connections thereto.
Figure 8:
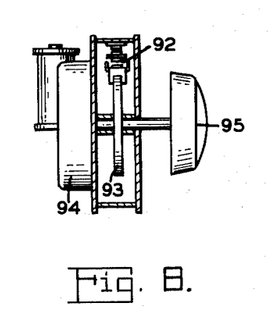
Figure 8 is a view of the dryer timer through line 8—8 of Figure 1 showing the cam contained therein.
Figure 9:
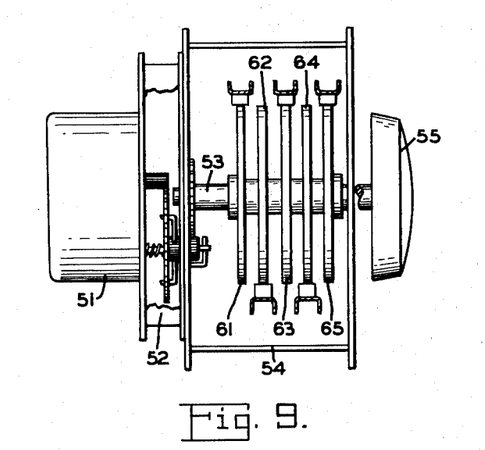
Figure 9 is a view of the wash timer through line 9—9 of Figure 1 showing the five cams contained therein.

As previously mentioned, this machine is designed to wash, rinse and dry clothing contained therein automatically and without attention by an operator. For the purpose of closing the electrical circuit as shown in Figure 7 to cause the several control mechanisms to be actuated in the desired sequence, a motor driven cam switch mechanism shown in Figure 9 is employed. Such mechanism uses preferably a self-starting synchronous electric motor such as is normally used in electric clocks.

As shown in Figure 9, a motor 51 drives an escapement 52 which may be of the general type disclosed in Patent Number 2,227,133 and which will cause a cam carrying shaft 53 to be advanced in rotation, preferably in increments, with an impulse moving said shaft 53 one increment each 45 seconds. The shaft 53 is enclosed inside a box 54, and mounted on the shaft 53 where it extends outside the box 54 is a dial 55 which serves as an indicator, as a means to start the machine, and to vary the setting as will later appear.

Mounted in spaced relationship on the shaft 53 are five cams, 61, 62, 63, 64 and 65. Adjacent each of these five cams is a spring switch member shown in the wiring diagram in Figure 7 as 66 for cam 61, 67 for 62, 68 for 63, 69 for 64, and 70 for 65. The spring switch members are in continual contact with the outer circumference of the cams and it is apparent from inspection of Figure 7 that due to the lands and grooves in the circumference of the cams rotation of cam 61 will cause spring switch member 66 to come in contact with either contact 71 or contact 72 or to be held in a position between the two contacts 71 and 72; rotation of cam 62 will cause spring switch 67 to close contact 73 or 74; rotation of cam 63 will cause spring switch 68 to close contact 75 or 76 or to remain in a neutral position between said contacts, rotation of cam 64 will cause spring switch 69 to close contact 77 or 78 or to remain in neutral position between said contact; and rotation of cam 65 will cause spring switch 70 to close contact 79 or to remain in a neutral position.

Figure 6:
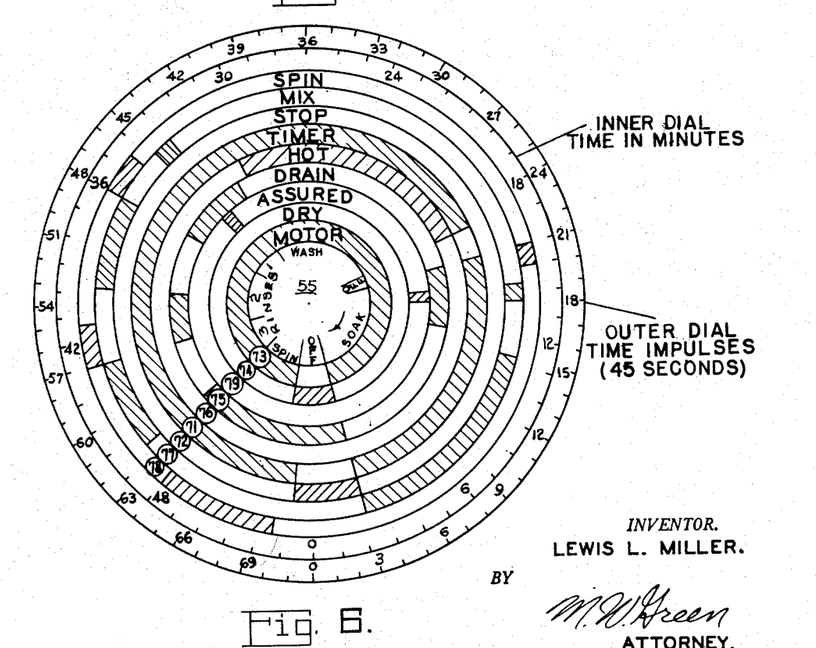
Figure 6 is a cycle diagram showing the cycle of operations for both washing and drying and showing the time in both minutes and in degrees of rotation of the timer, during which each portion of the cycle is in operation.

The function of the elements of the machine resulting from the closing of any of the various contacts together with the time in minutes and in degrees of rotation of the timer shaft 53 and indicator dial 55 is shown in the cycle chart, Figure 6. The outer numbered dial in Figure 6 indicates degrees of rotation of the timer shaft, with each division of the circle representing 5 degrees of rotation or one 45 second impulse of the timer, whereas the inner numbered dial indicates time in minutes with each division of the circle representing 1 minute. The shaded portion of each circle indicates the time during which the function or element represented by that circle is actuated.

The cam disks 61 to 65 shown in Figure 7 have been cut to provide cycles of operation as indicated by the chart in Figure 6. This chart and the cutting of the cam disks 61 to 65 have been based on experience as to the length of time desirable for each operation of the automatic machine.

In putting the combined washing and drying machine in operation, the timer dial 55 shown in Figure 9, is rotated through 20 degrees of the "off" period. As shown in Figure 7 this breaks contacts 66—72, 67—74 and 68—75 and closes contacts 66—71, 67—73. After 45 seconds motor 51 causes the cams to index 5 degrees, closing contacts 69—77. Closing contacts 66—71 supplies current to the wash timer motor 51 closing contact 67—73 supplies current to wash motor 16 and contacts 68 and 69; and closing contact 69—77 supplies current to actuate the solenoid 32, thereby causing hot and cold water to be mixed in the valve 31 and admitted into the tub 10 through the opening 28. It will be noted that the solenoid 32 may be actuated to admit water into the machine only when the tub 10 is empty, since when the tub 10 is full, a float 80 opens a switch 81 breaking the circuit to the mixing valve solenoid 32. The float 80 is enclosed in a housing 82 and is connected with the tub 10 through the sump 18 by means of the hose 83 as shown in Figure 2.

After 12 more impulses or 9 minutes contacts 69—77 separate due to rotation of the cam 64 to prevent admission of additional wash water. Forty five seconds later contacts 68—75 close for five impulses of ¾ minute to open a drain valve 84 by actuation of solenoid 85. At the expiration of 1½ minutes of the drain period contacts 70—79 and 69—77 close for an "assured" spray. This is called an "assured" spray since water will be admitted regardless of whether or not the switch 81 controlled by the float 80 is closed or not to insure that even if the float chamber 82 is full of soap suds and that consequently the float 80 is at the top to open the switch 81, nevertheless water will be admitted to the machine in order to disperse any suds remaining therein. Contacts 69—77 and 70—79 open again after 45 seconds ending the assured spray and 45 seconds later contacts 69—78 close for 45 seconds thereby actuating a solenoid 86 to initiate the spin cycle. At the end of the spin the period of energization for drain solenoid 85 ends with contacts 69—78 and 68—75 also open. Contacts 66—71 also open breaking the circuit to the wash timer 51 and contact 73 thus completing the soak cycle.

Further manual rotation of about 10 degrees of the timer dial 55 initiates the wash period by again closing contacts 66—71 supplying current to wash timer 51 and contact 73 as previously described. Contacts 73—67 have remained closed from the soak cycle into the present wash cycle supplying current to contacts 68 and 69 and contacts 68—76 are closed after 45 seconds to supply current to a selector switch 87. If the selector switch, embodying contacts 88, 89 and 90 is set for "hot," contacts 88—89 are closed energizing a hot water solenoid 91 as long as the float switch 81 is closed. After a period of 18 impulses or 13½ minutes of the wash period, contacts 68—76 open to prevent further addition of wash water. Forty-five seconds later contacts 68—75 close energizing the drain solenoid 85 for a period of 4½ minutes. After 1½ minutes contacts 69—77 and 70—79 close providing another assured spray in the same manner as before by actuating the solenoid 32. The duration of the assured spray is 45 seconds, after which contacts 69—77 and 70—79 open and the spray is terminated, since the solenoid 32 is no longer energized. After another 45 second period contacts 69—78 close for 1½ minutes to provide for a spin by actuating the spin solenoid 86.

As the spin and drain periods are ended by breaking contacts 68—75 and 69—78 contacts 69—77 close for 3 and ¾ minutes to actuate solenoid 32 thereby to admit mixed water as long as float switch 81 is closed. At the end of this period contacts 68—75 are closed for 3 minutes to energize drain solenoid 85.

After 1½ minutes of the drain period, contacts 69—78 close energizing spin solenoid 86. As is apparent from inspection of the wiring diagram, the spin solenoid can never be energized when the tub is full, since otherwise the switch 81 controlled by the float 80 will be open and the circuit to the spin solenoid 86 will not be complete. This is necessary, since to actuate the high speed spinning of the cylinder 11 when the tub 10 was full of water might result in an undue strain on the motor and in excessive vibration. At the conclusion of the 3 minute drain cycle, contacts 68—75 and 69—78 open deenergizing the drain solenoid 85 and the spin solenoid 86. Simultaneous with the opening of contacts 68—75 and 69—78 is the closing of contacts 69—77 to actuate the mixed water solenoid 32 as long as switch 81 is closed by action of the float 80. At the end of this period contacts 75—68 again close to again actuate the drain solenoid 85. Contacts 75—68 now remain closed and effective for 6 minutes which is all that now remains of the combined washing, rinsing, and extracting periods. However, at the end of 1½ minutes of this drain period contacts 69—78 close energizing solenoid 86 which remains energized for 4½ minutes at the end of which time contacts 69—78 open again to deenergize the spin solenoid 86. At the same time contacts 67—73 open and 67—74 close, thus deenergizing all portions of the unit except the timer motor which is still energized through contacts 66—71. Forty-five seconds later contacts 66—71 break and 66—72 close thereby ending the wash cycle.

Figure 10:
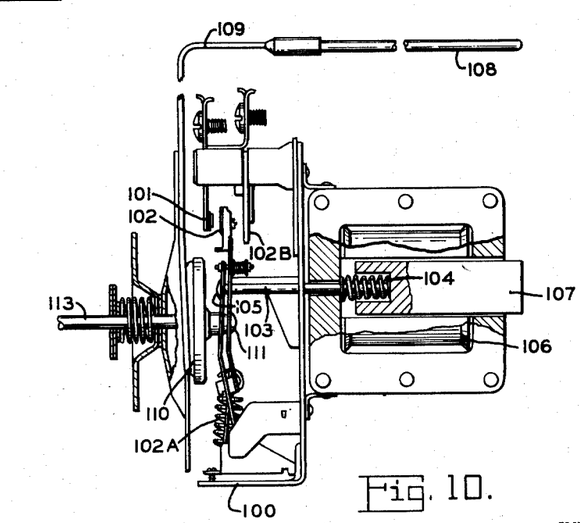
Figure 10 is a view of the thermostatic temperature regulator through line 10—10 of Figure 1.

Closing of contacts 66—72 energizes contact 92 which is actuated by the cam 93, the cam 93 being rotated by the dryer timer motor 94. If the dryer has not been set previously by manually rotating the dial 95 or is not set at this time, all components of the unit remain at rest. However, if the dryer timer has been set, contact 92 has been closed with contact 96 and contact 96 has been closed with contact 97. Closing contacts 92—96 energizes the dryer timer motor 94, blower motor 23, condenser spray solenoid 37 for cold water and contacts 67, 68 and 89. When contact 92 is energized through contacts 66—72 as previously stated contacts 67—74 are closed energizing the main drive motor 16 and contacts 75—68 are likewise closed to actuate the drain solenoid 85. When contact 97 is energized, the solenoid operating the relay thermostat 100, shown in more detail in Figure 10, is energized and actuated. This relay thermostat is provided with contacts 101 and 102, with contacts 101 being stationary and contacts 102 being moveable and being normally urged toward contact 101 by the toggle spring 102A. During the washing, rinsing, and extracting cycles contact 102 is held away from contact 101 by means of the rod 103 which is slidably mounted through a clearance hole in the arm supporting contact 102. A spring 104 normally urges the rod 103 to the right as seen in Figure 10, and since the rod 103 is provided with a head 105 larger than the clearance hole in the arm carrying contact 102 through which the rod 103 is inserted, the action of the spring 104 pulls the contact 102 to the right against the action of spring 102A to the position shown in Figure 10. A stop 102B is provided to limit the movement of the contact 102. However, when the contact 97 is closed to begin the drying cycle, a solenoid 106 is energized. The armature 107 of the solenoid 106 is connected to the rod 103, and when the solenoid 106 is energized the armature 107 and attached rod 103 are urged to the left, with the rod 103 being pushed through the clearance hole in the contact 102, thus freeing the contact 102 and permitting it to close with contact 101. Closing of contacts 101 and 102 permits current to flow to the heating elements 24 as shown on Figure 7. When the heating elements 24 have produced sufficient heat to exceed a predetermined "critical" temperature within the tub 10, fluid in a bulb 108 mounted within the tub 10 and shown in Figures 2 and 10, expands, and is carried through a tube 109 to a bellows 110 which is likewise caused to expand. A projection on the bellows is in contact with the lower portion of the arm supporting contact 102, and expansion of the bellows causes the projection to push the contact 102 away from contact 101, thus breaking the circuit and cutting the current to the heating elements 24.

After the heating element has been off a sufficient length of time to permit the temperature to fall below the critical temperature, the liquid in the bulb 108 contracts, as does the bellows 110, and the projection 111 is moved away from the contact 102, thus permitting it to again close with contact 101. The critical temperature may be varied by turning a knob 112 attached to a shaft 113. Rotation of the knob 112 changes the distance between the projection 111 and the lower part of the contact 102, thus varying the temperature at which the projection 111 will push the contact 102 away from contact 101 and thereby break the circuits. At the expiration of all but 5 minutes of the time for which the drying timer has been set, contacts 92 and 96 break with contact 97, deenergizing the relay thermostat 100 and shutting off the heater 24. Current to the heater may also be cut off by the high limit switch 114 controlled by a thermostat containing a bi-metal element which is mounted on a wall of the duct 22 of the machine and which is so constructed as to cut off the current by causing deenergization of solenoid 106 if the temperature exceeds a predetermined maximum. The former (bulb) thermostat, as described, is adjustable to operate at various temperatures and functions as a heat control mechanism, whereas the high limit switch 114 is not adjustable and serves only as a safety device to open the circuit to relay solenoid 106 and thereby cause the opening of the heater circuit if the temperature in the duct 22 becomes excessively high, which heat will be transferred to the switch 114 through the wall of the duct 22.

Upon completion of the five minutes "overrun" period, contacts 92 and 96 break, deenergizing all the components of the machine. Thus the machine is left in a position such that turning of either timer—either its wash timer, or the dryer timer—will cause resumption of the function controlled thereby.

I claim:

1. In a combination washing and drying machine, a control mechanism therefor comprising, in combination, an electrical circuit for said machine, a sequential controller in said circuit adapted to provide for automatic operation of said machine through a series of washing, rinsing, and extraction periods; a timer in said circuit for controlling operation of said machine when said machine is used as a dryer; a control member in said circuit which may be manually and independently pre-set to cause said timer and said machine to automatically commence operation as a dryer after termination of said washing, rinsing and extracting periods.

2. In a combined washing, rinsing, extraction, and drying machine, an electrical circuit for said machine, a controller for automatically causing said machine to operate through its washing, rinsing, and extracting stages; an indicator moveable with the controller to show the position thereof and the stage of operation being performed; clock mechanism in said circuit for driving the controller and for stopping said controller after termination of said washing, rinsing, and extracting period; a timer in said circuit for controlling operation of said machine when said machine is used as a dryer; a control member in said circuit which may be manually and independently pre-set to cause said timer and said machine to automatically commence operation as a dryer after termination of said washing, rinsing, and extraction periods.

3. In a combined washing, rinsing, extracting, and drying machine; an electrical circuit for said machine, a controller in said circuit for automatically causing said machine to operate through its washing, rinsing, and extracting periods; a control member in said circuit which may be manually and independently pre-set to cause said machine to automatically commence operation as a dryer after termination of said washing, rinsing, and extraction periods; a heating element in said circuit for said dryer; a thermostat in said circuit to control said heating element; means for preventing said thermostat from functioning when said machine is used for washing, rinsing, and extracting; means to cause said thermostat to operate when said machine is used for drying.

4. In a combined washing, rinsing, extracting, and drying machine of the type described; an electrical circuit for said machine, a heating element in said circuit for use when said machine is used for drying; a thermostat in said circuit to control said heating element; means for preventing said thermostat from functioning when said machine is used for washing, rinsing, and extracting; means in said circuit to cause said thermostat to operate when said machine is used for drying and presettable means to actuate said element automatically after said washing, rinsing and extracting.

5. In a combined washing, rinsing, extracting, and drying machine; an electrical circuit for said machine, a controller in said circuit for automatically causing said machine to operate through its washing, rinsing and extracting stages; a manually presettable control member in said circuit to cause said machine to automatically commence operation as a dryer after termination of said washing, rinsing, and extraction periods; a heating element in said circuit for use when said machine is used for drying; a thermostat in said circuit to control said heating element; and a contact in said thermostat for closing the circuit through said heating element; upon actuation of said control member.

6. In a combined washing, rinsing, extracting, and drying machine; an electrical circuit for said machine, a controller in said circuit for automatically causing said machine to operate through its washing, rinsing, and extracting stages; a control member in said circuit which may be manually and independently pre-set to cause said machine to automatically commence operation as a dryer after termination of said washing, rinsing, and extraction periods; a heating element in said circuit for use when said machine is used for drying; a thermostat in said circuit to control said heating element; a contact in said thermostat for closing the circuit through said heating element; a spring normally holding said contact in an open position; a solenoid in said circuit for closing said contact against the action of said spring; thermostatic means for opening said contact when the temperature in said machine exceeds a predetermined critical temperature; and manual means to vary said critical temperature above which said contact will be opened.

7. In a combination washing and drying machine, a sequential controller for automatic operation of said machine through a series of washing, rinsing and extraction periods, drying means in said machine, presettable means to selectively and automatically actuate said drying means after said periods, and presettable means to control the duration of operation of said drying means.

8. In a combination laundry washing and drying machine a sequential controller for automatic operation of said machine through a series of washing, rinsing and extraction periods, heat drying means in said machine for drying said laundry, presettable means to automatically actuate said heat drying means after completion of said periods, and manual and independent presettable means to control the duration of operation of said heat drying means.

9. In a combination laundry washing and drying machine a sequential controller for automatic operation of said machine through a series of washing, rinsing and extraction periods, heat drying means in said machine for drying said laundry after said extraction period, means to automatically actuate said drying means after said extraction period, thermostatic means in operative relation with said drying means, said thermostatic means having means responsive to temperature to deactuate said drying means after a predetermined temperature of the interior of said machine has been reached, and means to preset the duration of operation of said drying means.

10. In a combination washing and drying machine, a sequential controller for automatic operation of said machine through a series of washing, rinsing and extraction periods, heat drying means in said machine, presettable means to actuate said drying means and to control the duration of operation of said drying means, and thermostatic means to control the temperature of said drying means.

11. In a combination washing and drying machine, a sequential controller for automatic operation of said machine through a series of washing, rinsing and extraction periods, a dryer in said machine, said dryer including air circulation and vapor condensation means, presettable means to automatically actuate said dryer after said periods, and presettable means to automatically deactuate said dryer after a predetermined period of time.

LEWIS L. MILLER.

References Cited in the file of this patent

UNITED STATES PATENTS

| Number | Name | Date |
|---|---|---|
| 1,976,196 | Sawyer | Oct. 9, 1934 |
| 2,023,115 | Biebel | Dec. 3, 1935 |
| 2,155,255 | Crago | Apr. 18, 1939 |
| 2,225,407 | Bassett, Jr. | Dec. 17, 1940 |
| 2,283,612 | Perry | May 19, 1942 |
| 2,328,256 | Breckenridge | Aug. 31, 1943 |
| 2,347,190 | Geldhof et al. | Apr. 25, 1944 |
| 2,434,476 | Wales | Jan. 13, 1948 |
| 2,496,517 | Bradley, Jr. | Feb. 7, 1950 |
| 2,533,888 | Kahn | Dec. 12, 1950 |